(12) United States Patent
Fischbach

(10) Patent No.: US 7,017,862 B1
(45) Date of Patent: Mar. 28, 2006

(54) WAKE VORTEX VISUALIZER FOR AN AIRCRAFT

(76) Inventor: Jack T. Fischbach, 27478 Rest Cir., Easton, MD (US) 21601

( * ) Notice: Subject to any disclaimer, the term of this patent is extended or adjusted under 35 U.S.C. 154(b) by 549 days.

(21) Appl. No.: 10/893,696

(22) Filed: Jan. 8, 2003

(51) Int. Cl.
B64C 23/06 (2006.01)

(52) U.S. Cl. .................................... 244/199.3
(58) Field of Classification Search .............. 244/199, 244/1 R, 199.1–199.3, 207, 136; 40/213
See application file for complete search history.

(56) References Cited

U.S. PATENT DOCUMENTS

| 1,426,338 | A | * | 8/1922 | Sperry | 116/18 |
| 1,912,392 | A | * | 6/1933 | Wilkinson | 244/136 |
| 2,250,762 | A | * | 7/1941 | Haberlin | 244/136 |
| 3,278,141 | A | * | 10/1966 | Wolcott | 244/136 |
| 3,964,304 | A | * | 6/1976 | Parrish | 73/147 |
| 5,975,425 | A | * | 11/1999 | Carlton | 239/3 |
| 2003/0222795 | A1 | * | 12/2003 | Holforty et al. | 340/968 |

OTHER PUBLICATIONS

"Boeing 747 with Smoke Generator installed for Vortex Study". Boeing Photo collection, Oct. 24, 1979. 3 pages.*
"B-727 in Flight during vortex study with wingtip smoke generator". Boeing Photo Collection, Nov. 15, 1973. 2 pages.*
"Advisory Cicular Aircraft Wake Turbulence", AC no; 90-23E, Oct. 1, 1991, 7 pages.*

* cited by examiner

Primary Examiner—Galen Barefoot

(57) ABSTRACT

A wake vortex visualizer for an aircraft having a selfcontained device that is installed within the wing tip to emit a smoke-like trail from the wing tip automatically by the use of simple ball check valve connected between an orifice on the wing tip and a tank of vapor forming fluid during takeoff and landing of the aircraft such that other following aircraft may see and avoid the vortex generated by said aircraft during takeoff and landing.

2 Claims, 1 Drawing Sheet

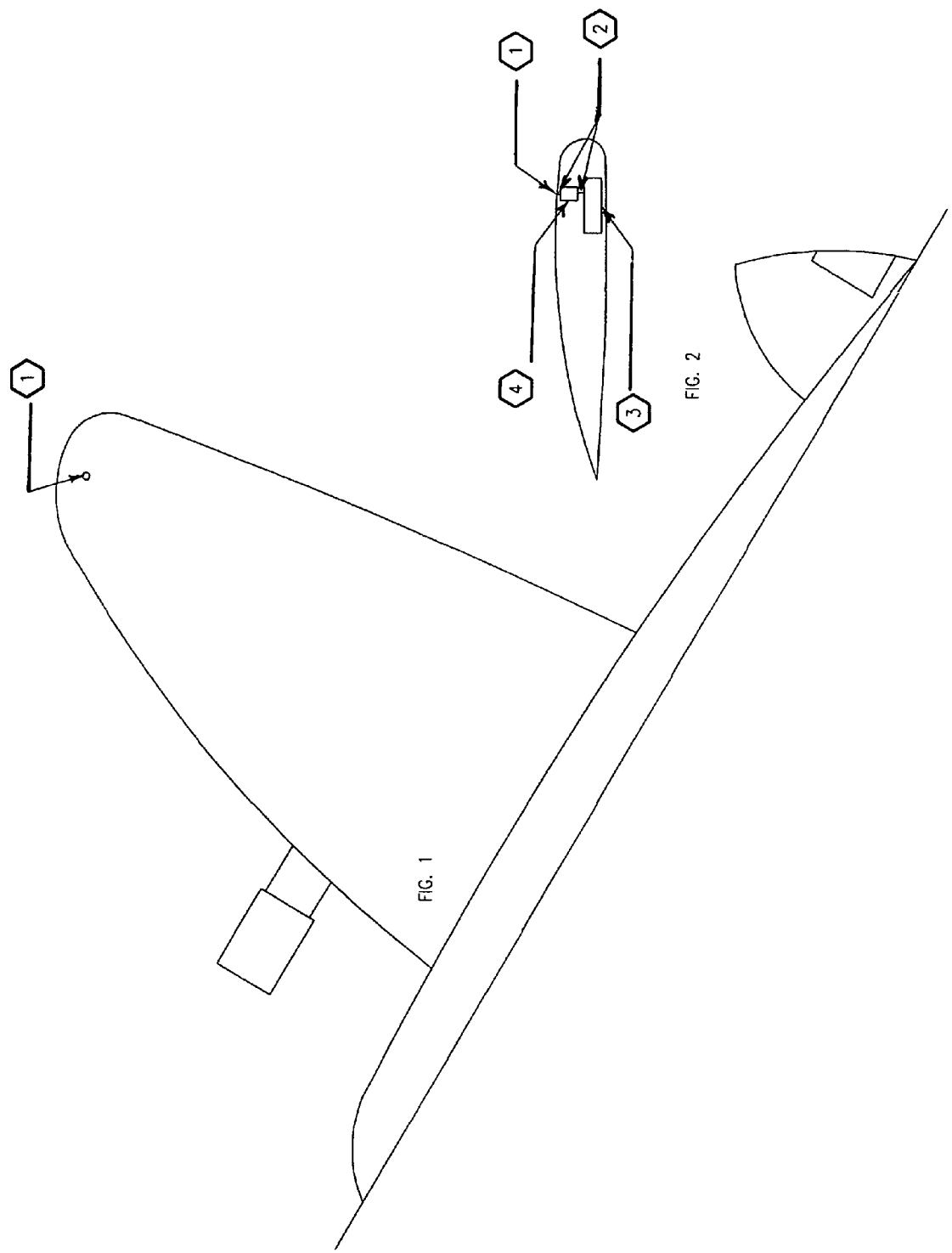

WAKE VORTEX VISUALIZER FOR AN AIRCRAFT

CROSS-REFERENCE TO RELATED APPLICATIONS

None.

STATEMENT REGARDING FEDERALLY SPONSORED RESEARCH OR DEVELOPMENT

None.

THE NAMES OF THE PARTIES TO A JOINT RESEARCH AGREEMENT

None.

INCORPORATION-BY-REFERENCE OF MATERIAL SUBMITTED ON A COMPACT DISC (See 37 CFR 1.52(e)(5) and MPEP 608.05. Computer program listings (37 CFR 1.96(c)), "Sequence Listings" (37 CFR 1.821(c)), and tables having more than 50 pages of text are permitted to be submitted on compact discs.) or REFERENCE TO A "MICROFICHE APPENDIX" (See MPEP §608.05(a). "Microfiche Appendices" were accepted by the Office until Mar. 1, 2001.)

None.

BACKGROUND OF THE INVENTION (1) Field of the Invention

When heavy aircraft are in their takeoff and landing modes they generate wing tip vortices that pose a hazzard to other aircraft that are following the heavy aircraft.

(2) Description of Related Art Including Information Disclosed under 37 CFR 1.97 and 1.98

The prior art is aircraft with no vortex visualization means or ones that have a manually operated smoke generating tube attached to the wing tip.

BRIEF SUMMARY OF THE INVENTION

An aircraft having at least one main lifting wing, each main lifting wing having a wing tip that generates a wing tip vortex during operation thereof. The invention comprises a selfcontained automatic wake vortex visualizer that is installed within the wing tip of the aircraft.

BRIEF DESCRIPTION OF THE DRAWING(S)

FIG. 1 is an elevation view of a heavy aircraft wing showing the location of the orifice on the wing tip.

FIG. 2 is a cross-section of the wing tip showing the location of the wake vortex visualizer.

DETAILED DESCRIPTION OF THE INVENTION

A wake vortex visualizer for an aircraft is disclosed. The aircraft is a heavy lift aircraft having at least one main lifting wing with a wing tip that generates a wing tip vortex during operation thereof. The wake vortex visualizer comprises a selfcontained device that is installed within the wing tip as shown in FIG. 2. The selfcontained device has an orifice (1) on an upper surface of the wing tip, the orifice (1) is connected to a pressure operated valve (4), the pressure operated valve (4) comprises a housing that contains a ball check valve assembly constrained by a spring in a closed position and is opened by the reduced pressure at the orifice (1) on the wing tip during operation of the aircraft at landing and takeoff speeds, the housing is connected by a tube (2) to a supply tank (3) containing a vapor forming fluid that emits a smoke-like trail from the orifice (1) on the wing tip automatically during takeoff and landing of said aircraft such that other following aircraft may see and avoid the vortex generated by said aircraft during takeoff and landing.

I claim:

1. A wake vortex visualizer for an aircraft having at least one main lifting wing, each said at least one main lifting wing having a wing tip that generates a wing tip vortex during operation thereof, the wake vortex visualizer comprising:

a selfcontained device that is installed within the wing tip comprising:

an orifice on an upper surface of the wing tip, the orifice is connected to a pressure operated valve, the pressure operated valve comprises a housing that contains a valve assembly constrained by a spring in a closed position and is opened by the reduced pressure at the orifice on the wing tip during operation of the aircraft at landing and takeoff speeds, the housing is connected by a tube to a supply tank containing a vapor forming fluid that emits a smoke-like trail from the orifice on the wing tip automatically during takeoff and landing of said aircraft such that other following aircraft may see and avoid the vortex generated by said aircraft during takeoff and landing.

2. A wake vortex visualizer for an aircraft as set forth in claim 1, wherein said valve assembly comprises a spring loaded ball check valve.

* * * * *